US011370915B2

(12) United States Patent
Lee et al.

(10) Patent No.: US 11,370,915 B2
(45) Date of Patent: *Jun. 28, 2022

(54) POLYARYLENE SULFIDE RESIN COMPOSITION AND FORMED ARTICLE

(71) Applicant: SK CHEMICALS CO., LTD., Gyeonggi-do (KR)

(72) Inventors: Se-Ho Lee, Gyeonggi-do (KR); Sung-Gi Kim, Gyeonggi-do (KR)

(73) Assignee: HDC POLYALL Co., Ltd., Ulsan (KR)

( * ) Notice: Subject to any disclaimer, the term of this patent is extended or adjusted under 35 U.S.C. 154(b) by 49 days.

This patent is subject to a terminal disclaimer.

(21) Appl. No.: 16/661,976

(22) Filed: Oct. 23, 2019

(65) Prior Publication Data

US 2020/0056040 A1 Feb. 20, 2020

Related U.S. Application Data

(63) Continuation of application No. 14/428,711, filed as application No. PCT/KR2013/008450 on Sep. 17, 2012, now Pat. No. 10,494,526.

(30) Foreign Application Priority Data

Sep. 19, 2012 (KR) ........................ 10-2012-0104007

(51) Int. Cl.
C08L 81/04 (2006.01)
C08G 75/0263 (2016.01)
C08G 75/0213 (2016.01)
C08G 75/14 (2006.01)
C08G 75/02 (2016.01)
C08L 81/02 (2006.01)
C08G 75/029 (2016.01)
C08K 7/14 (2006.01)
C08L 33/14 (2006.01)
C08L 77/00 (2006.01)

(52) U.S. Cl.
CPC .............. C08L 81/04 (2013.01); C08G 75/02 (2013.01); C08G 75/029 (2013.01); C08G 75/0213 (2013.01); C08G 75/0263 (2013.01); C08G 75/14 (2013.01); C08K 7/14 (2013.01); C08L 33/14 (2013.01); C08L 81/02 (2013.01); C08L 77/00 (2013.01)

(58) Field of Classification Search
CPC .............. C08G 75/02; C08G 75/0204; C08G 75/025–0295; C08G 75/14; C08L 81/02; C08L 81/04

See application file for complete search history.

(56) References Cited

U.S. PATENT DOCUMENTS 2,513,188 A 6/1950 Macallum
2,583,941 A 1/1952 Gordon
4,552,676 A 11/1985 Norris
4,746,758 A 5/1988 Rule et al.
4,786,713 A 11/1988 Rule et al.
4,792,600 A 12/1988 Rule et al.
4,952,671 A * 8/1990 Fagerburg ............... C08G 75/14
528/226
4,977,236 A 12/1990 Fagerburg et al.
5,015,703 A 5/1991 Takekoshi et al.
5,155,176 A 10/1992 Bagrodia et al.
5,180,775 A 1/1993 Bagrodia et al.
5,182,345 A 1/1993 Bagrodia et al.
5,247,030 A 9/1993 Kohler et al.
6,001,934 A 12/1999 Yamanaka et al.
8,859,720 B2 10/2014 Shin et al.
9,255,183 B2 2/2016 Kim et al.
10,875,966 B2 * 12/2020 Lee ........................ C08L 81/04
2009/0275683 A1 11/2009 Lee et al.
2011/0257363 A1 * 10/2011 Shin .................. C08G 75/0268
528/375
2013/0115438 A1 5/2013 Park et al.
2015/0218376 A1 8/2015 Lee et al.

FOREIGN PATENT DOCUMENTS

| CN | 102325826 | 1/2012 |
| CN | 102652153 | 8/2012 |
| CN | 104520352 | 4/2015 |
| EP | 0458462 | 11/1991 |
| EP | 0549977 | 7/1993 |
| EP | 2380921 | 10/2011 |

(Continued)

OTHER PUBLICATIONS

Pesapane et al., "Dynamic Infrared Study of Polyphenylene Sulfide Using Planar Array Infrared Spectroscopy," Applied Spectroscopy, 2008, vol. 62(10), pp. 1124-1128.
International Search Report and Written Opinion prepared by the Korean Intellectual Property Office dated Dec. 24, 2013, for International Application No. PCT/KR2013/008450.
Extended Search Report for European Patent Application No. 13840059.3, dated May 20, 2016, 8 pages.
Official Action for U.S. Appl. No. 14/428,711, dated Jun. 2, 2016 22 pages.
Official Action for U.S. Appl. No. 14/428,711, dated Mar. 24, 2017 12 pages.
Official Action for U.S. Appl. No. 14/428,711, dated Nov. 8, 2017.
Official Action for U.S. Appl. No. 14/428,711, dated Apr. 24, 2018.
Notice of Allowance for U.S. Appl. No. 14/428,711, dated Jul. 23, 2019.

Primary Examiner — Kregg T Brooks
(74) Attorney, Agent, or Firm — Locke Lord LLP; Scott D. Wofsy

(57) ABSTRACT

The present invention relates to a polyarylene sulfide resin composition having good processability and showing excellent properties due to its more improved miscibility with other polymer materials or fillers, and a formed article. Such polyarylene sulfide resin composition includes a polyarylene sulfide including a disulfide repeating unit in the repeating units of the main chain; and at least one component selected from the group consisting of a thermoplastic resin, a thermoplastic elastomer, and a filler.

19 Claims, No Drawings

(56) References Cited

FOREIGN PATENT DOCUMENTS

| | | |
|---|---|---|
| EP | 2546281 | 1/2013 |
| EP | 2570449 | 3/2013 |
| JP | H10-279802 | 10/1988 |
| JP | H02-286719 | 11/1990 |
| JP | H04-153262 | 5/1992 |
| JP | H06-507440 | 8/1994 |
| JP | H07-502546 | 3/1995 |
| JP | H07-505166 | 6/1995 |
| JP | 2013-528680 | 7/2013 |
| JP | 2015-524014 | 8/2015 |
| KR | 10-2009-0045219 | 5/2009 |
| KR | 10-2010-0073733 | 7/2010 |
| KR | 10-2011-0124985 | 11/2011 |
| KR | 10-2012-0093348 | 8/2012 |
| WO | WO 2008/082265 | 7/2008 |
| WO | WO 2008/082267 | 7/2008 |
| WO | WO 2011/070968 | 6/2011 |
| WO | WO 2011/111983 | 9/2011 |
| WO | WO 2011/142557 | 11/2011 |

\* cited by examiner

POLYARYLENE SULFIDE RESIN COMPOSITION AND FORMED ARTICLE

CROSS REFERENCE TO RELATED APPLICATIONS

This application is a continuation of and claims priority to U.S. application Ser. No. 14/428,711, filed Mar. 17, 2015 entitled "Polyarylene Sulfide Resin Composition And Formed Article" which is a national stage application under 35 U.S.C. 371 and claims the benefit of PCT Application No. PCT/KR2013/008450 having an international filing date of Sep. 17, 2013, which designated the United States, which PCT application claimed the benefit of Korean Patent Application No. 10-2012-0104007 filed Sep. 19, 2012, the disclosure of each are incorporated herein by reference.

TECHNICAL FIELD

The present invention relates to a polyarylene sulfide resin composition showing excellent properties because of more improved compatibility with other polymer materials or fillers, and a formed article.

BACKGROUND OF THE INVENTION

Now, polyarylene sulfide is a representative engineering plastic, and the demand for the products being used in a high temperature and corrosive environment or the electronic goods is increasing due to its high heat resistance and chemical resistance, flame resistance, electric insulation, and so on.

Among the polyarylene sulfides, polyphenylene sulfide (PPS) is one and only commercially on sale now. The commercial preparation process of PPS being applicable until now is the method of carrying out a solution polymerization of p-dichlorobenzene (pDCB) and sodium sulfide in a polar organic solvent such as N-methylpyrrolidone. The method is known as Macallum process.

However, when the polyarylene sulfide is prepared by the Macallum process of such solution polymerization type, a salt type by-product may be formed in a solution polymerization process using sodium sulfide, and thus there is a disadvantage of requiring a washing or drying process for eliminating a salt type by-product or a residual organic solvent. Furthermore, since the polyarylene sulfide prepared by such Macallum process has a powder form, the post processability and workability may decrease. Moreover, in the case of the polyarylene sulfide prepared by the Macallum process, the polyarylene sulfide includes a considerable amount of oligomer type polymer chains having low molecular weight, and thus there is a problem of that the processability decreases because a considerable amount of flash occurred when forming an article requiring high degree of precision and a separate process was required for eliminating the same.

Accordingly, a method of melt-polymerizing a reactant including diiodoaromatic compounds and sulfur element was suggested as the method of preparing the polyarylene sulfide such as PPS and the like. Such method does not form a salt type by-product and not use an organic solvent in the preparation process of the polyarylene sulfide, and thus it does not require an additional process for eliminating them. Furthermore, since the polyarylene sulfide prepared finally has a pellet form, there is an advantage of easy post processability and good workability.

However, in the case of the polyarylene sulfide prepared by the melt-polymerization method, the ends of the main chain were composed of iodine and most aryl groups (representatively, benzene). Therefore, there was a disadvantage of that such polyarylene sulfide was inferior in the compatibility with other polymer materials or all sorts of reinforcements or fillers like glass fiber and the like due to the characteristics of its main chain structure.

Due to this, it was hard to compound the polyarylene sulfide prepared by the melt-polymerization method with other polymer materials or fillers for securing optimized properties suitable to various uses, and it was difficult to show optimized properties even if it was compounded with them. Due to such problem, in the case of prior known polyarylene sulfide resin composition, it was true that it was difficult to exhibit sufficient properties suitable for the use and the applications for various uses were limited.

And, it has been continuously required to develop a polyarylene sulfide showing reduced flash occurrence and more excellent processability when it is intended to prepare an article requiring high degree of precision.

SUMMARY OF THE INVENTION

It is an aspect of the present invention to provide a polyarylene sulfide resin composition showing good processability and excellent properties because of its more improved miscibility with other polymer materials or fillers.

It is another aspect of the present invention to provide a formed article including the polyarylene sulfide resin composition and showing the optimized properties for its use, and a preparation method thereof.

The present invention provides a polyarylene sulfide resin composition, including a polyarylene sulfide including a disulfide repeating unit in the repeating units of the main chain; and at least one component selected from the group consisting of a thermoplastic resin, a thermoplastic elastomer, and a filler.

The present invention also provides a method of preparing a formed article, including the step of extruding said polyarylene sulfide resin composition.

The present invention also provides a formed article including said polyarylene sulfide resin composition.

Hereinafter, the polyarylene sulfide resin composition according to specific embodiment of the invention, the formed article including the same, and the preparation method thereof are explained in more detail. However, the embodiment is provided only for an example of the invention, and the scope of the invention is not limited to or by them and it is obvious to a person skilled in the art that various modifications are possible in the scope of the invention.

In this description, "include" or "comprise" means to include any components (or ingredients) without particular limitation unless there is no particular mention about them, and it cannot be interpreted as a meaning of excluding an addition of other components (or ingredients).

According to one embodiment of the invention, a polyarylene sulfide resin composition, including a polyarylene sulfide including a disulfide repeating unit in the repeating units of the main chain; and at least one component selected from the group consisting of a thermoplastic resin, a thermoplastic elastomer, and a filler is provided.

In such polyarylene sulfide resin composition, the disulfide repeating unit may mean the polyarylene disulfide repeating unit of General Formula 2 including the disulfide bond (—S—S— linkage) instead of the sulfide bond in the repeating unit of general polyarylene sulfide represented by General Formula 1:

[General Formula 1]

[General Formula 2]

in General Formulae 1 and 2, Ar represents a substituted or non-substituted arylene group.

Like this, as the polyarylene sulfide included in the resin composition of one embodiment has the disulfide repeating unit, it is possible to prevent the oligomer type polymer chain having excessively low molecular weight from being included in the polyarylene sulfide. It seems because the disulfide bond in the disulfide repeating unit continuously causes a sulfur transfer reaction between the polymer chains of the polyarylene sulfide, and can uniformize the molecular weight of the polymer chains of the polyarylene sulfide on the whole. As the result, the polyarylene sulfide included in the resin composition of one embodiment can include the oligomer type polymer chains having excessively low molecular weight minimally, and can show relatively narrow and symmetric molecular weight distribution curve close to a normal distribution, because the molecular weight distribution of the whole polymer chains is uniformized. Therefore, the resin composition of one embodiment including the polyarylene sulfide can show reduced flash occurrence and more improved processability even when it is used for preparing an article requiring high degree of precision.

And, the disulfide repeating unit may be included in the amount of about 3 weight % or less, about 0.01 to 3.0 weight %, or about 0.1 to 2.0 weight %, based on the whole polyarylene sulfide. According to this, the processability improvement effect of the disulfide repeating unit may be optimized, and it is possible to prevent the properties of the polyarylene sulfide from getting worse because of the excessively much disulfide repeating unit.

And, though it will be explained in more detail later, in the resin composition of one embodiment, the polyarylene sulfide may be what is prepared by adding a polymerization inhibitor step by step, more specifically, the polyarylene sulfide may be what is prepared by melt-polymerizing a reactant including diiodoaromatic compounds and sulfur element while adding the polymerization inhibitor step by step, dividedly into 2 times or more.

The present inventors revealed that a polyarylene sulfide which showed better compatibility with other polymer materials or fillers and could be compounded with various materials and could realize optimized properties suitable to various uses could be obtained by adding the polymerization inhibitor step by step, in the process of preparing a polyarylene sulfide by melt-polymerizing a reactant including a diiodoaromatic compound and sulfur element.

It seems to be caused by the theoretical principal disclosed below.

When the polymerization inhibitor is added in the process of the melt-polymerization, iodomolecules are formed at the ends of the polymer chains. At this time, the reactivity of iodine formed at the end of the polymer chain can be increased because the final step of the reaction where the polymerization inhibitor is added is carried out at high temperature of around 300° C. Therefore, such iodine can cause the generation of branched structure or crosslinked bond of the polymer chain, and, if the polymerization inhibitor is added thereto step by step, the formed iodine may be eliminated more effectively than the polymerization inhibitor is added at a time and the generation of the branched structure or the crosslinked bond can be suppressed more. As the result, the linearity of the polyarylene sulfide polymer chain can be improved and thus it is possible to obtain the polyarylene sulfide which shows better compatibility with other polymer materials or fillers and can be compounded with various materials and can realize optimized properties suitable to various uses.

Meanwhile, in the resin composition of one embodiment, the polyarylene sulfide may include carboxyl group (—COOH) or amine group (—NH$_2$) bonded to at least part of end groups of the main chain.

From the result of continuous research of the present inventors, it was revealed that a polyarylene sulfide which showed better compatibility with other polymer materials or fillers and could be compounded with various materials and could realize optimized properties suitable to various uses could be obtained by introducing the specific end groups, in the process of preparing a polyarylene sulfide by melt-polymerizing a reactant including a diiodoaromatic compound and sulfur element.

Namely, in the case of the polyarylene sulfide prepared by prior melt-polymerization method, the ends of the main chain were composed of iodine and most aryl groups (representatively, benzene). Therefore, there was a disadvantage of that such polyarylene sulfide was inferior in the compatibility with other polymer materials or all sorts of reinforcements or fillers like glass fiber and the like due to the characteristics of its main chain structure.

However, in the case of the polyarylene sulfide including a reactive group such as carboxyl group (—COOH) or amine group (—NH$_2$) bonded to at least part of end groups of the main chain, it is recognized that it shows excellent compatibility with other polymer materials or fillers because of the existence of the reactive group. As the result, in the case of the resin composition including other polymer materials such as a thermoplastic resin or a thermoplastic elastomer or a filler in company with the polyarylene sulfide, it shows optimized property increase caused by mixing (for example, compounding) with other materials while having good heat resistance and chemical resistance unique to the polyarylene sulfide and excellent mechanical properties, and thus it makes it possible to provide a formed article having excellent properties suitable to various uses. Therefore, polyarylene sulfide resin compositions can be applied to various uses by virtue of the resin composition of one embodiment.

Finally, the resin composition of one embodiment hardly generates flashes and shows excellent processability when forming an article requiring high degree of precision, and can show more excellent synergistic effect of compounding because of good compatibility of the polyarylene sulfide and other materials, and thus makes it possible to provide a formed article having the properties suitable to various uses.

The polyarylene sulfide included in the resin composition of one embodiment may show the peak of about 1600 to 1800 cm$^{-1}$ derived from carboxyl groups of the ends of the main chain or the peak of about 3300 to 3500 cm$^{-1}$ derived from amine group, in a FT-IR spectrum, when it is analyzed with FT-IR spectroscopy. At this time, the intensity of the peak of 1600 to 1800 cm$^{-1}$ or the peak of 3300 to 3500 cm$^{-1}$ may correspond to the amount of carboxyl groups or amine groups connected to the ends of main chain.

According to one example, in the FT-IR spectrum of the polyarylene sulfide of one embodiment, if the height of the ring stretch peak shown at about 1400 to 1600 cm$^{-1}$ is assumed as the intensity of 100%, the relative height intensity of the peak of about 1600 to 1800 cm$^{-1}$ or about 3300 to 3500 cm$^{-1}$ may be about 0.001 to 10%, about 0.01 to 7%, about 0.1 to 4%, or about 0.5 to 3.5%. At this time, the ring stretch peak shown at 1400 to 1600 cm$^{-1}$ may be what is derived from the arylene group such as phenylene and the like included in the main chain of the polyarylene sulfide. Since the height intensity of the peak of about 1600 to 1800 cm$^{-1}$ derived from carboxyl groups or the peak of about 3300 to 3500 cm$^{-1}$ derived from amine groups is about 0.001 to 10%, about 0.01 to 7%, about 0.1 to 4%, or about 0.5 to 3.5% in comparison to the height intensity of the peak derived from the arylene group (for example, phenylene group), the polyarylene sulfide included in the resin composition of one embodiment can show good compatibility with other polymer materials or fillers and can maintain excellent properties unique to the polyarylene sulfide. Therefore, the resin composition of one embodiment can exhibit more excellent synergistic effect according to the compounding of the polyarylene sulfide and other polymer materials or fillers.

Meanwhile, the melting temperature of the polyarylene sulfide included in the resin composition of one embodiment may be about 265 to 290° C., about 270 to 285° C., or about 275 to 283° C. Because of such melting temperature range, the polyarylene sulfide of one embodiment obtained by melt-polymerization method, to which carboxyl group or amine group is introduced, can show excellent heat resistance and flame retardance.

And, the number average molecular weight of the polyarylene sulfide may be about 5,000 to 50,000, about 8,000 to 40,000, or about 10,000 to 30,000. The polydispersity index defined as the weight average molecular weight divided by the number average molecular weight may be about 2.0 to 4.5, about 2.0 to 4.0, or about 2.0 to 3.5. Because the polyarylene sulfide of one embodiment has such polydispersity index and molecular weight range, it can show excellent mechanical properties and processability and can be processed into various formed articles for various uses.

Furthermore, above polyarylene sulfide of one embodiment may have the melt viscosity of about 10 to 50,000 poise, about 100 to 20,000, or about 300 to 10,000, which is measured with a rotational viscometer at 300° C. The polyarylene sulfide having such melt viscosity and the resin composition of one embodiment including the same can show superior mechanical properties in company with excellent processability.

For example, the polyarylene sulfide included in the resin composition of one embodiment may have the tensile strength of about 100 to 900 kgf/cm$^2$, about 200 to 800 kgf/cm$^2$, or about 300 to 700 kgf/cm$^2$, which is measured according to ASTM D 638, and the elongation of about 1 to 10%, about 1 to 8%, or about 1 to 6%, which is measured according to ASTM D 638. Furthermore, the polyarylene sulfide of one embodiment may have the flexural strength of about 100 to 2,000 kgf/cm$^2$, about 500 to 2,000 kgf/cm$^2$, or about 1,000 to 2,000 kgf/cm$^2$, which is measured according to ASTM D 790, and the impact strength of about 1 to 100 J/m, about 5 to 50 J/m, or about 10 to 20 J/m, which is measured according to ASTM D 256. Like this, the polyarylene sulfide of one embodiment can show good compatibility with other polymer materials or fillers and can exhibit excellent properties. In company with this, the resin composition of one embodiment can exhibit higher synergistic effect caused by the compounding of each component and excellent properties suitable to various uses because it can show excellent compatibility with other polymer materials and fillers disclosed above.

Meanwhile, the resin composition of one embodiment includes other polymer material such as a thermoplastic resin or a thermoplastic elastomer or a filler in company with the polyarylene sulfide including carboxyl group or amine group bonded to the ends of the main chain. At this time, as the example of polymer material which can be included in the resin composition of one embodiment, there may be various thermoplastic resins such as polyvinylalcohol-based resins, vinylchloride-based resins, polyamide-based resins, polyolefin-based resins, polyester-based resins, and the like; or various thermoplastic elastomers such as polyvinylchloride-based elastomers, polyolefin-based elastomers, polyurethane-based elastomers, polyester-based elastomers, polyamide-based elastomers, polybutadiene-based elastomers, and the like.

And, as the filler which can be included in the resin composition, a fiber type, a bead type, a flake type, or a powder type of organic or inorganic filler may be used, as the specific example of the same, there may be various reinforcements/fillers such as glass fiber, carbon fiber, boron fiber, glass bead, glass flake, talc, calcium carbonate, and the like. Among the fillers, glass fiber or carbon fiber may be representatively used, and the surface of the glass fiber and the like may be treated or untreated with a silane coupling agent and the like. However, when the surface is treated with the silane coupling agent, the cohesive force or the compatibility of the filler and the polyarylene sulfide may be improved more.

Since the polyarylene sulfide included in the resin composition of one embodiment shows excellent compatibility with such various polymer materials or fillers, the resin composition of one embodiment can show excellent synergistic effect caused by mixing (for example, compounding) with various other polymer materials or fillers, and can show optimized properties suitable to various uses. However, it goes without saying that other various polymer materials or reinforcements/fillers, in addition to the polymer materials or fillers disclosed above, may be included with the polyarylene sulfide in the resin composition of one embodiment, and can show more excellent properties. More particularly, various polymer materials or fillers may be included in the resin composition of one embodiment for further improving the mechanical properties, heat resistance, weather resistance, or formability without particular limitation.

And, the resin composition of one embodiment may include about 5 to 95 weight % or about 50 to 90 weight % of the polyarylene sulfide and about 5 to 95 weight % or about 10 to 50 weight % of one or more components selected from the group consisting of thermoplastic resins, thermoplastic elastomers, and fillers. By including each component in above content range, the resin composition of one embodiment can optimize the synergistic effect caused by mixing with other components while maintaining excellent properties unique to the polyarylene sulfide, and can exhibit excellent properties preferably applicable to various uses.

Meanwhile, the resin composition of one embodiment may further include an additive and/or a stabilizer in order to improve the mechanical properties, heat resistance, weather resistance or formability supplementally. The kind of such additive is not limited particularly but, for example, an oxidation stabilizer, a photo stabilizer (UV stabilizer and so on), a plasticizer, a lubricant, a nucleating agent, or an impact reinforcement may be used, and 2 or more additives selected from them may be further included therein.

Among the additives, a primary or secondary antioxidant may be used as the oxidation stabilizer, and for example, a hindered phenol-based, an amine-based, or a phosphorous-based antioxidant may be used. And, the photo stabilizer may be used when the resin composition of one embodiment is applied to an exterior material, and particularly, an UV stabilizer may be representatively used, for example, benzotriazole or benzophenol may be used.

And, the lubricant may be used for improving the formability when shaping or processing the resin composition of one embodiment, and a hydrocarbon-based lubricant may be representatively used. By using the lubricant, it is possible to prevent friction between the resin composition and a metallic mold or to secure the releasing property for the secession from a metallic mold.

And, in the process of forming the resin composition, various nucleating agents may be used for improving the crystallization rate, and, by this, it is possible to improve the solidification rate of the product during extrusion or molding process and to reduce the cycle time for preparing the product.

Meanwhile, the resin composition of one embodiment disclosed above includes the melt-polymerized polyarylene sulfide including carboxyl group (—COOH) or amine group (—NH$_2$) bonded to the end groups of the main chain, and the polyarylene sulfide may be prepared by the method including the steps of: polymerizing a reactant including a diiodoaromatic compound and sulfur element; and adding a compound having carboxyl group or amine group thereto while carrying out the polymerization step. And, the method may further include the step of adding 0.01 to 30 parts by weight of additional sulfur per 100 parts by weight of sulfur element already included in the reactant, for example, in order to regulate the amount of the disulfide repeating unit included in the polyarylene sulfide to be a proper range. In addition, the method may further include the step of adding a polymerization inhibitor at the fixed point of the melt-polymerization step, and such polymerization inhibitor may be added step by step, dividedly into 2 times or more.

Hereinafter, the preparation method of such polyarylene sulfide is explained in more detail.

In the preparation method of the polyarylene sulfide, the compound having carboxyl group or amine group may be added thereto when the degree of polymerization reaction of the diiodoaromatic compound and sulfur element is progressed about 90% or more, or about 90% or more and less than 100%, (for example, in the latter part of the polymerization reaction), wherein the degree of polymerization reaction is determined by the ratio of present viscosity to target viscosity. The degree of polymerization reaction can be determined as the ratio of present viscosity to target viscosity. For this, an objective molecular weight of the polyarylene sulfide and a target viscosity corresponding to the objective molecular weight are set up, and the present viscosity according to the degree of polymerization reaction is measured. At this time, the present viscosity may be differently measured by a method well-known to a person skilled in the art in accordance with the scale of reactor. For example, when the polymerization is carried out in a relatively small polymerization reactor, it may be measured by using a viscometer after taking a sample from the reactor where the polymerization reaction is progressing. On the other hand, when the reaction is carried out in a huge continuous polymerization reaction, the present viscosity may be measured continuously in real time with a viscometer installed in the reactor itself.

Like this, the melt-polymerized polyarylene sulfide of which carboxyl group (—COOH) or amine group (—NH$_2$) is introduced to at least part of end groups of the main chain can be prepared by adding and reacting the compound having carboxyl group or amine group in the latter part of the polymerization reaction of the reactant including the diiodoaromatic compound and sulfur element. Particularly, since the compound having carboxyl group or amine group is added in the latter part of the polymerization reaction, proper amount of carboxyl group or amine group can be introduced to the end groups of the main chain, and the polyarylene sulfide of one embodiment having not only good compatibility with other polymer materials or fillers but also excellent properties unique to the polyarylene sulfide can be prepared effectively.

Meanwhile, in the preparation method of the polyarylene sulfide, an arbitrary monomer compound having carboxyl group or amine group may be used as the compound having carboxyl group or amine group. As the examples of the compound having carboxyl group or amine group, 2-iodobenzoic acid, 3-iodobenzoic acid, 4-iodobenzoic acid, 2,2'-dithiobenzoic acid, 2-iodoaniline, 3-iodoaniline, 4-iodoaniline, 2,2'-dithiodianiline, or 4,4'-dithiodianiline may be used, and various compounds having carboxyl group or amine group can be used in addition.

Furthermore, the compound having carboxyl group or amine group may be added thereto in the amount of about 0.0001 to 5 parts by weight, about 0.001 to 3 parts by weight, or about 0.01 to 2 parts by weight, based on 100 parts by weight of the diiodoaromatic compound. Proper amount of carboxyl group or amine group can be introduced to the end groups of the main chain by adding such amount of the compound having carboxyl group or amine group, and consequently, the polyarylene sulfide of one embodiment having not only good compatibility with other polymer materials or fillers but also excellent properties unique to the polyarylene sulfide can be prepared effectively.

Furthermore, the polyarylene sulfide is basically prepared by the method of polymerizing the reactant including diiodoaromatic compounds and sulfur element, and thus it can show superior mechanical properties to what is prepared by prior Macallum process.

At this time, the diiodoaromatic compound may be one or more compounds selected from the group consisting of diiodobenzene (DIB), diiodonaphthalene, diiodobiphenyl, diiodobisphenol, and diiodobenzophenone, but not limited to or by them, diiodoaromatic compounds that alkyl group or sulfone group is connected to above compounds as a substituent or an oxygen or nitrogen atom is included in the aromatic group may also be used. There are various diiodo-compound isomers of diiodoaromatic compounds depending on the position of iodine atoms, and a compound having iodine at para-position like para-diiodobenzene (pDIB), 2,6-diiodonaphthalene, or p,p'-diiodobiphenyl may be used more preferably.

And, the form of sulfur element which reacts with the diiodoaromatic compound is not limited particularly. Generally, sulfur elements exist in a cyclooctasulur (S8) form in which 8 atoms are connected at room temperature. However, if not such form, any solid type or liquid type sulfur which can be used commercially may be used without particular limitation.

And, as disclosed above, additional sulfur element may be added during the polymerization reaction step in order to regulate the amount of the disulfide repeating unit included in the polyarylene sulfide, for example, to regulate the amount to be in the proper range of about 3 weight % or less. A person skilled in the art can determine the amount of the added sulfur element by considering proper amount of the disulfide repeating unit but, for example, the amount may be 0.01 to 30 parts by weight per 100 parts by weight of sulfur element included in the initial reactant. The additional sulfur element may be added when the polymerization reaction is progressed about 50 to 99%, for example, and it may be added apart from or in company with the compound having carboxyl group or amine group disclose above.

Meanwhile, the reactant for preparing the polarylene sulfide may further include a polymerization initiator, a stabilizer, or a mixture thereof in addition to the diiodoaromatic compound and sulfur element, and one or more initiator selected from the group consisting of 1,3-diiodo-4-nitrobenzene, mercaptobenzothiazole, 2,2'-dithiobenzothiazole, cyclohexylbenzothiazole sulfenamide, and butylbenzothiazole sulfonamide may be used as the polymerization initiator, for example, but it is not limited to or by them.

And, common stabilizer for polymerization reaction or resins may be used as the stabilizer unlimitedly.

Meanwhile, during the polymerization reaction, a polymerization inhibitor may be added thereto at the time when the polymerization is somewhat progressed. At this time, any polymerization inhibitor which can terminate the polymerization by eliminating iodine group included in the polymerized polymer can be used without particular limitation. Specifically, one or more compounds selected from the group consisting of diphenyl sulfide, diphenyl ether, diphenyl, benzophenone, dibenzothiazole disulfide, monoiodoaryl compound, benzothiazoles, benzotriazoles, benzothiazolesulfenamides, thiurams, dithiocarbamates, and diphenyl disulfide may be used.

More preferably, the polymerization inhibitor may be one or more compounds selected from the group consisting of iodobiphenyl, iodophenol, iodoaniline, iodobenzophenone, 2-mercaptobenzothiazole, 2,2'-dithiobisbenzothiazole, 2,2'-dithiobisbenzotriazole, N-cyclohexylbenzothiazole-2-sulfenamide, 2-morpholinothiobenzothiazole, N, N-dicyclohexylbenzothiazole-2-sulfenamide, tetramethylthiuram monosulfide, tetramethylthiuram disulfide, zinc dimethyldithiocarbamate, zinc diethyldithiocarbamate, and diphenyl disulfide may be used.

Meanwhile, the time of adding the polymerization inhibitor may be determined by considering the molecular weight of the polyarylene sulfide to be polymerized finally. For example, the inhibitor may be added at the time of that about 70 to 100 wt % of the diiodoaromatic compound included in the initial reactant are reacted and exhausted.

And, the polymerization inhibitor may be added step by step, dividedly into 2 times or more, after adding the polymerization inhibitor at first. For example, if the amount of the polymerization inhibitor to be used is determined, it is divided into 2 or more doses, for example, 2 to 10 doses or 3 to 7 doses, and the inhibitor may be dividedly added thereto step by step at intervals of about 5 to 30 mins and the rest of the polymerization is carried out. By the stepwise insertion of the polymerization inhibitor, as disclosed above, the linearity of the polyarylene sulfide polymer chain can be improved and thus it is possible to obtain excellent compatibility with other polymer materials or fillers. As the result, the polyarylene sulfide which can be compounded with various materials and can realize optimized properties suitable to various uses can be obtained.

And, the polymerization reaction may be carried out in any condition which can initiate the polymerization of the reactant including the diiodoaromatic compound and sulfur element. For example, the polymerization reaction may be carried out in a temperature-rising and pressure-reducing reaction condition. At this time, the condition may be carried out for about 1 to 30 hrs while varying the temperature and pressure condition from the initial reaction condition of about 180 to 250° C. and about 50 to 450 torr to the final reaction condition of about 270 to 350° C. and about 0.001 to 20 torr. For more concrete example, the polymerization reaction may be carried out with the final reaction condition of about 280 to 300° C. and 0.1 to 0.5 torr.

Meanwhile, the preparation method of the polyarylene sulfide disclosed above may further include the step of melt-compounding the reactant including the diiodoaromatic compound and sulfur element before the polymerization reaction. The condition of the melt-compounding is not limited as long as whole reactant is melted and compounded, and for example, the process may be carried out at the temperature of about 130° C. to 200° C., or about 160° C. to 190° C.

Like this, by carrying out the melt-compounding step before the polymerization reaction, it is possible to carry out succeeding polymerization reaction more easily.

Furthermore, in the preparation method of the polyarylene sulfide disclosed above, the polymerization reaction may be carried out in the presence of a nitrobenzene-based catalyst. And, when the melt-compounding step is carried out before the polymerization reaction as disclosed above, the catalyst may be added in the melt-compounding step. As the nitrobenzene-based catalyst, 1,3-diiodo-4-nitrobenzene, or 1-iodo-4-nitrobenzene may be used but it is not limited to or by them.

The melt-polymerized polyarylene sulfide having carboxyl group or amine group at the end groups of the main chain can be obtained by the preparation method disclosed above, and the polyarylene sulfide shows excellent compatibility with other polymer materials or fillers. Therefore, the resin composition of one embodiment can be obtained by using the same.

Furthermore, according to another embodiment of the invention, a formed article including the polyarylene sulfide resin composition of one embodiment disclosed above, and the preparation method thereof are provided. The formed article may be prepared by the method including the step of extruding the resin composition of one embodiment disclosed above.

Hereinafter, such formed article and the preparation method are explained in more detail. However, additional explanation for the kind and the content of the components which can be included in the formed article is skipped here because they are already explained about the resin composition of one embodiment.

The formed article of another embodiment includes the melt-polymerized polyarylene sulfide having carboxyl group or amine group, one or more components selected from the group consisting of thermoplastic resins, thermoplastic elastomers, and fillers, and selective other additives and it may be prepared by extruding the resin composition of one embodiment prepared by mixing the components.

Such formed article may include about 5 to 95 weight % or about 50 to 90 weight % of the polyarylene sulfide and about 5 to 95 weight % or about 10 to 50 weight % of one or more components selected from the group consisting of thermoplastic resins, thermoplastic elastomers, and fillers, and it may further include about 2 parts by weight, for example about 0.1 to 2 parts by weight, of other additive, per 100 parts by weight of the sum of above two components.

For example, the additive such as an oxidation stabilizer or a lubricant may be included in the amount of about 0.1 to 1 parts by weight, and the additive such as a hardener may be included in the amount of about 0.1 to 2 parts by weight. The formed article can show excellent properties preferably applicable to various uses by satisfying such content range.

Furthermore, when preparing the formed article by mixing and extruding the resin composition including the components, a twin screw extruder, for example, may be used, and the aspect ratio (L/D) of such twin screw extruder may be around 30 to 50.

According to one example, the additives included in a small quantity may be mixed with the polyarylene sulfide in advance by using a mixer such as a super mixer, and the primary composition mixed beforehand may be fed into the twin screw extruder through the main feeder. And, other polymer material such as a thermoplastic resin or a thermoplastic elastomer or a filler may be fed separately through the side feeder positioned at the side of the extruder. At this time, the side feeding position may be the point of about ⅓ to ½ of the whole barrel of the extruder from the outlet. By this, it is possible to prevent the filler and the like from being broken by the rotation and friction generated by the screw in the extruder.

The formed article of another embodiment may be obtained by extruding the resin composition of one embodiment, after mixing each component of the same like this.

The formed article of another embodiment may be various shapes of film, sheet, fiber, and the like. And, the formed article may be an injection molded article, an extruded article, or a blown article. In the injection molding process, the mold temperature may be about 50° C. or more, about 60° C. or more, or about 80° C. or more in the aspect of crystallization, and the temperature may be about 190° C. or less, about 170° C. or less, or about 160° C. or less in the aspect of deformation of specimen.

And, if the formed article is a film or a sheet, it may be made into an undrawn, a uniaxially drawn, or a biaxially drawn film or sheet. If it is a fiber, it may be made into an undrawn, a drawn, or an ultradrawn fiber, and it may be used to a fabric, a knit, a nonwoven (spunbond, meltblown, or staple), a rope, or a net.

Such formed articles may be used to electric & electronic parts such as computer parts, architectural elements, car parts, machine parts, daily necessities, coating parts to which chemical materials contact, industrial chemical resistant fiber, and the like.

In the present invention, further details besides the disclosure above may be added and subtracted with necessity, and they are not limited particularly in the present invention.

Effects of the Invention

The present invention can provides a resin composition including, a melt-polymerized polyarylene sulfide including carboxyl group or amine group at the ends of the main chain and showing not only excellent processability but also good compatibility with other polymer materials and/or reinforcements/fillers in company with other polymer material or a filler.

Such resin composition can exhibit excellent properties optimized to various uses and excellent properties unique to the polyarylene sulfide. It seems because the compatibility of each component of the resin composition is increased and the properties of each component can show a synergistic effect.

Therefore, such resin composition can be applied to various uses, and can exhibit excellent properties and effects.

DETAILED DESCRIPTION OF THE EMBODIMENT

Hereinafter, preferable examples are presented for understanding the present invention. However, the following examples are only for illustrating the present invention and the present invention is not limited to or by them.

Example 1: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 51 g of 4-iodobenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 1 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 3.4% when the height intensity of the ring stretch peak shown at about 1400 to 1600 $cm^{-1}$ was assumed as 100%.

Example 2: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C.

and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 51 g of 4-iodoaniline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 2 was analyzed by FT-IR spectroscopy. At this time, the amine group peak was recognized at about 3300 to 3500 $cm^{-1}$ in the spectrum. It was also recognized that the relative height intensity of the peak at about 3300 to 3500 $cm^{-1}$ was about 1.4% when the height intensity of the ring stretch peak shown at about 1400 to 1600 $cm^{-1}$ was assumed as 100%.

Example 3: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 25 g of 4-iodobenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 3 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 2.1% when the height intensity of the ring stretch peak shown at about 1400 to 1600 $cm^{-1}$ was assumed as 100%.

Example 4: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 25 g of 4-iodoaniline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 4 was analyzed by FT-IR spectroscopy. At this time, the amine group peak was recognized at about 3300 to 3500 $cm^{-1}$ in the spectrum. It was also recognized that the relative height intensity of the peak at about 3300 to 3500 $cm^{-1}$ was about 1.1% when the height intensity of the ring stretch peak shown at about 1400 to 1600 $cm^{-1}$ was assumed as 100%.

Example 5: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 51 g of 2,2'-dithiodibenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 5 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 3.2% when the height intensity of the ring stretch peak shown at about 1400 to 1600 $cm^{-1}$ was assumed as 100%.

Example 6: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 51 g of 4,4'-dithiodianiline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 6 was analyzed by FT-IR spectroscopy. At this time, the amine group peak was recognized at about 3300 to 3500 $cm^{-1}$ in the spectrum. It was also recognized that the relative height intensity of the peak at about 3300 to 3500 $cm^{-1}$ was about 1.3% when the height intensity of the ring stretch peak shown at about 1400 to 1600 $cm^{-1}$ was assumed as 100%.

Example 7: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 25 g of 2,2'-dithiodibenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 7 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 1.9% when the height intensity of the ring stretch peak shown at about 1400 to 1600 $cm^{-1}$ was assumed as 100%.

Example 8: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. And then, sulfur was added thereto 3 times, 0.2 g at a time, at intervals of 1 hour in order to control the content of the disulfide. Subsequently, after adding 25 g of 4,4'-dithiodianiline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 8 was analyzed by FT-IR spectroscopy. At this time, the amine group peak was recognized at about 3300 to 3500 cm$^{-1}$ in the spectrum. It was also recognized that the relative height intensity of the peak at about 3300 to 3500 cm$^{-1}$ was about 1.0% when the height intensity of the ring stretch peak shown at about 1400 to 1600 cm$^{-1}$ was assumed as 100%.

Example 9: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto step by step, 5 g at a time, at intervals of 10 mins as a polymerization inhibitor and the reaction was carried out for 1 hr after the last inhibitor was added. And then, sulfur was added thereto 3 times, 0.2 g at a time, at intervals of 1 hour in order to control the content of the disulfide. Subsequently, after adding 25 g of 4-iodobenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 9 was analyzed by FT-IR spectroscopy. At this time, the carboxyl group peak was recognized at about 1600 to 1800 cm$^{-1}$ in the spectrum. It was also recognized that the relative height intensity of the peak at about 1600 to 1800 cm$^{-1}$ was about 2.2% when the height intensity of the ring stretch peak shown at about 1400 to 1600 cm$^{-1}$ was assumed as 100%.

Example 10: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto step by step, 5 g at a time, at intervals of 10 mins as a polymerization inhibitor and the reaction was carried out for 1 hr after the last inhibitor was added. And then, sulfur was added thereto 3 times, 0.2 g at a time, at intervals of 1 hour in order to control the content of the disulfide. Subsequently, after adding 25 g of 4-iodoaniline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 10 was analyzed by FT-IR spectroscopy. At this time, the amine group peak was recognized at about 3300 to 3500 cm$^{-1}$ in the spectrum. It was also recognized that the relative height intensity of the peak at about 3300 to 3500 cm$^{-1}$ was about 1.3% when the height intensity of the ring stretch peak shown at about 1400 to 1600 cm$^{-1}$ was assumed as 100%.

Comparative Example 1

The polyarylene sulfide (MV: 2,000 poise, Tm: 282° C.; Celanese) made by Macallum process was prepared.

Comparative Example 2

The polyarylene sulfide (MV: 2,300 poise, Tm: 281° C.; Deyange) made by Macallum process by other company than Comparative Example 1 was prepared.

Comparative Example 3

Product name Z200 of DIC Co., Ltd. in which the polyarylene sulfide made by Macallum process was compounded with an elastomer was used as Comparative Example 3.

Experimental Example 1: Evaluation on Basic Properties of Polyarylene Sulfide The properties of polyarylene sulfides of Examples 1 to 10 and Comparative Examples 1 and 2 were evaluated by the following methods:

Melting Temperature (Tm)

By using a differential scanning calorimeter (DSC), after elevating the temperature of the specimen from 30° C. to 320° C. with a scanning speed of 10° C./min and cooling to 30° C., the melting temperature was measured while elevating the temperature from 30° C. to 320° C. again with a scanning speed of 10° C./min.

Number Average Molecular Weight (Mn) and Polydispersity Index (PDI)

After dissolving the polyarylene sulfide in 1-chloronaphthalene at 250° C. for 25 minutes with stirring so as to be 0.4 wt % solution, the polyarylene sulfide was divided in order in the column of a high temperature gel permeation chromatography (GPC) system (210° C.) by flowing the solution with the flow rate of 1 mL/min, and the intensity corresponding to the molecular weight of the divided polyarylene sulfide was measure by using a RI detector. After making a calibration line with a standard specimen (polystyrene) of which the molecular weight was known, the relative number average molecular weight (Mn) and polydispersity index (PDI) of the measure sample was calculated.

Melt Viscosity (Poise)

The melt viscosity (hereinafter, 'W.V.') was measured at 300° C. by using a rotating disk viscometer. In frequency sweep measuring method, angular frequency was measured from 0.6 to 500 rad/s, and the viscosity at 1.84 rad/s was defined as the melt viscosity (M.V.).

Measurement on Flowability of Polymer

A spiral test which has been generally used for measuring the flowability of polymerized polymer was used. For the following test, every polymerized specimen was cut into pellets having the diameter of 1~2 mm and the length of 2~4 mm during the polymer came out of the polymerization reactor. At this time, the maximum injection pressure in the injection machine, the injection charge, the ejection rate, the pressure of injection, and the holding pressure were uniformly regulated, and the injection temperature (based on barrel) was fixed to 320° C. After the spiral test, the final length of the formed article separated from the mold was measured, and the results are listed in Table 1.

Measurement on Flashes Formed During the Preparation of Formed Article

After spiral test was carried out by using the polymers of Comparative Examples and Examples, except the main shaped body corresponding to the mold which was used to the spiral test, the thin parts held between the front part and the back part of the mold were cut and weighed as flashes.

The properties measured like above are listed in the following Table 1:

Experimental Example 2: Evaluation on Mechanical Properties of Polyarylene Sulfide The mechanical properties of polyarylene sulfides of Examples 1 to 10 and Comparative Examples 1 and 2 were evaluated by the following methods:

Tensile Strength and Elongation

The tensile strength and the elongation of the polyarylene sulfide specimens prepared according to Examples 1 to 10 and Comparative Examples 1 and 2 were measured according to ASTM D 638 method.

Flexural Strength

The flexural strength of the polyarylene sulfide specimens prepared according to Examples 1 to 10 and Comparative Examples 1 and 2 were measured according to ASTM D 790 method.

Impact Strength (Izod)

The impact strength of the polyarylene sulfide specimens prepared according to Examples 1 to 10 and Comparative Examples 1 and 2 was measured according to ASTM D 256 method.

The mechanical properties measured according to above methods are listed in the following Table 2:

TABLE 2

| Classification | Tensile Strength (kgf/cm$^2$) | Elongation (%) | Flexural Strength (kgf/cm$^2$) | Impact Strength (J/m, Notched) |
|---|---|---|---|---|
| Example 1 | 612 | 2.2 | 1,430 | 17 |
| Example 2 | 602 | 1.2 | 1,422 | 20 |
| Example 3 | 622 | 2.1 | 1,433 | 18 |
| Example 4 | 614 | 1.3 | 1,442 | 17 |
| Example 5 | 628 | 2.2 | 1,455 | 18 |
| Example 6 | 605 | 1.2 | 1,428 | 17 |
| Example 7 | 611 | 2.3 | 1,435 | 17 |
| Example 8 | 618 | 1.3 | 1,447 | 19 |
| Example 9 | 630 | 2.4 | 1,475 | 22 |
| Example 10 | 625 | 1.5 | 1,465 | 20 |
| Comparative Example 1 | 650 | 3.4 | 1,490 | 27 |
| Comparative Example 2 | 647 | 2.8 | 1,475 | 25 |

TABLE 1

| Classification | Melting temperature (° C.) | Number Average Molecular Weight | Polydispersity Index (PDI) | Melt Viscosity (Poise) | Flowability (cm) | Amount of Flash Generation (g) |
|---|---|---|---|---|---|---|
| Example 1 | 278.6 | 17,667 | 2.9 | 2,940 | 48 | 0.01 |
| Example 2 | 278.3 | 17,614 | 2.9 | 2,200 | 58 | 0.15 |
| Example 3 | 278.8 | 17,435 | 2.8 | 2,830 | 50 | 0.04 |
| Example 4 | 278.6 | 17,224 | 2.8 | 2,770 | 52 | 0.08 |
| Example 5 | 277.5 | 17,338 | 2.9 | 2,350 | 58 | 0.12 |
| Example 6 | 277.7 | 17,152 | 2.9 | 2,930 | 49 | 0.01 |
| Example 7 | 278.3 | 17,531 | 2.8 | 2,470 | 57 | 0.15 |
| Example 8 | 278.7 | 17,582 | 2.8 | 2,530 | 55 | 0.10 |
| Example 9 | 279.1 | 17,884 | 2.8 | 2,450 | 58 | 0.08 |
| Example 10 | 279.0 | 17,912 | 2.8 | 2,360 | 59 | 0.12 |
| Comparative Example 1 | 282.0 | 15,237 | 3.1 | 2000 | 62 | 0.54 |
| Comparative Example 2 | 281.0 | 10,543 | 3.3 | 2300 | 57 | 0.42 |

Referring to Table 1, it is recognized that the polyarylene sulfides of Examples including the polyarylene disulfide repeating unit formed by adding sulfur during the preparation process show excellent processability when forming an article requiring high degree of precision because of their optimized flowability and small amount of flash generation. On the contrary, it is recognized that the polyarylene sulfides of Comparative Examples 1 and 2 show inferior processability to the polyarylene sulfides of Examples because of relatively large amount of flash generation.

The specimens were prepared by compounding the polyarylene sulfide of Examples 1 to 8 and Comparative Example 1 with other components according to the following methods:

Compounding of Polyarylene Sulfide and Glass Fiber (GF)

After drying the polymerized resin, the compounding was carried out with a small twin-screw extruder under the condition of the extrusion die temperature of 300° C. and the screw speed of 200 rpm while adding 40 parts by weight of glass fiber to 60 parts by weight of the resin.

Compounding of Polyarylene Sulfide and Elastomer

The mixing extrusion was carried out under the condition of the extrusion die temperature of 300° C. and the screw speed of 200 rpm while adding 10 parts by weight of Lotader (Grade AX-8840, made by Arkema), the elastomer, to 90 parts by weight of the resin.

The mechanical properties of the compounded specimens were evaluated by the same way as the polyarylene sulfide specimens and are listed in the following Table 3. Furthermore, such mechanical properties are listed together in the following Table 3 compared to the commercialized compounded specimen of Comparative Example 3:

TABLE 3

| Classification | Tensile Strength (kgf/cm²) | Elongation (%) | Flexural Strength (kgf/cm²) | Impact Strength (J/m, Notched) |
|---|---|---|---|---|
| Example 1 + Elastomer 10% | 583 | 25.2 | 1,030 | 54 |
| Example 2 + GF 40% | 1,750 | 1.8 | 2,440 | 85 |
| Example 3 + Elastomer 10% | 577 | 20.5 | 1,010 | 48 |
| Example 4 + GF 40% | 1,740 | 1.8 | 2,400 | 83 |
| Example 5 + Elastomer 10% | 564 | 24.3 | 1,010 | 52 |
| Example 6 + GF 40% | 1,770 | 1.8 | 2,480 | 86 |
| Example 7 + Elastomer 10% | 568 | 18.7 | 1,005 | 45 |
| Example 8 + GF 40% | 1,750 | 1.8 | 2,420 | 82 |
| Example 9 + Elastomer 10% | 603 | 27.5 | 1,130 | 60 |
| Example 10 + GF40% | 1,840 | 2.2 | 2,650 | 92 |
| Comparative Example 3 (Elastomer compounding) | 660 | 15.7 | 940 | 76 |

According to Tables 2 and 3, it was recognized that the elongation and the impact strength were largely increased by compounding the polyarylene sulfides of Examples 1 to 10 of which carboxyl group or amine group is introduce to the end of the main chain with the thermoplastic elastomer. And, it was recognized that the tensile strength was largely increased by compounding the polyarylene sulfides of Examples 1 to 10 with glass fiber. And, it was recognized that the elongation and the impact strength of the polyarylene sulfide of Example 9 prepared by adding the polymerization inhibitor step by step were largely improved by compounding the same with the thermoplastic elastomer. And, it was recognized that the tensile strength and the impact strength of the polyarylene sulfide of Example 10 were largely improved by compounding the same with the glass fiber. From the improvement of the properties caused by such compounding, it is recognized that the polyarylene sulfides of Examples can show excellent compatibility with various other polymer materials or fillers and thus the compounded resin composition can show excellent synergistic effect.

On the other hand, it was recognized that the polyarylene sulfides of Comparative Examples were inferior in the compatibility with other polymer materials or fillers and the synergistic effects caused by compounding was not so big.

The invention claimed is:

1. A polyarylene sulfide resin composition, including a polyarylene sulfide including a disulfide repeating unit in the repeating units of the main chain and having a target viscosity; and at least one component selected from the group consisting of a thermoplastic resin, a thermoplastic elastomer, and a filler,
   wherein the polyarylene sulfide includes carboxyl group (—COOH) bonded to at least part of end groups of the main chain,
   wherein the polyarylene sulfide is prepared by a method comprising the steps of: (a) melt-polymerizing a reactant comprising a diiodoaromatic compound and elemental sulfur while adding a polymerization inhibitor, and (b) adding a compound having a carboxyl group only when a degree of polymerization of the melt-polymerizing step as determined by a ratio of present viscosity to the target viscosity is at least about 90% to 95%; and
   wherein an FT-IR spectrum of the polyarylene sulfide shows a first peak between 1400 cm and 1600 cm$^{-1}$ and a second peak between 1600 cm and 1800 cm$^{-1}$, wherein a height intensity of the second peak is between about 0.5% and about 10% of a height intensity of the first peak.

2. The polyarylene sulfide resin composition according to claim 1, wherein the disulfide repeating unit is included in the amount of 3 weight % or less, based on the whole polyarylene sulfide.

3. A method of preparing a formed article, including the step of extruding the resin composition of claim 2.

4. A method of preparing a formed article, including the step of injection molding the resin composition of claim 2.

5. The method according to claim 4, wherein the injection molding is performed in a mold having a temperature of 50° C.

6. The polyarylene sulfide resin composition according to claim 1, wherein the thermoplastic resin is one or more selected from the group consisting of polyvinylalcohol-based resins, vinylchloride-based resins, polyamide-based resins, polyolefin-based resins, and polyester-based resins.

7. The polyarylene sulfide resin composition according to claim 1, wherein the thermoplastic elastomer is one or more selected from the group consisting of polyvinylchloride-based elastomers, polyolefin-based elastomers, polyurethane-based elastomers, polyester-based elastomers, polyamide-based elastomers, and polybutadiene-based elastomers.

8. The polyarylene sulfide resin composition according to claim 1, wherein the filler is a fiber type, a bead type, a flake type, or a powder type of organic or inorganic filler.

9. The polyarylene sulfide resin composition according to claim 1, wherein the filler is one or more selected from the group consisting of glass fiber, carbon fiber, boron fiber, glass bead, glass flake, talc, and calcium carbonate.

10. The polyarylene sulfide resin composition according to claim 1, wherein the number average molecular weight of the polyarylene sulfide is 5,000 to 50,000.

11. The polyarylene sulfide resin composition according to claim 1, including 5 to 95 weight % of the polyarylene sulfide and 5 to 95 weight % of one or more components selected from the group consisting of thermoplastic resins, thermoplastic elastomers, and fillers.

12. The polyarylene sulfide resin composition according to claim 1, further including an oxidation stabilizer, a photo stabilizer, a plasticizer, a lubricant, a nucleating agent, and an impact reinforcement.

13. A method of preparing a formed article, including the step of extruding the resin composition of claim 1.

14. The method according to claim 13, the extrusion is carried out with a twin screw extruder.

15. A formed article, including the polyarylene sulfide resin composition according to claim 1.

16. The formed article according to claim 15, which is a form of film, sheet, or fiber.

17. The formed article according to claim 15, which is used for car interior parts, car exterior parts, electric parts, electronic parts, or industrial materials.

18. A method of preparing a formed article, including the step of injection molding the resin composition of claim 1.

19. The method according to claim 18, wherein the injection molding is performed in a mold having a temperature of 50° C.

\* \* \* \* \*